United States Patent [19]

Crivello

[11] Patent Number: 5,747,172
[45] Date of Patent: May 5, 1998

[54] ULTRAVIOLET AND ELECTRON BEAM CURABLE PROPENYL-ETHER SILICONE RELEASE COMPOSITIONS

[75] Inventor: James V. Crivello, Clifton Park, N.Y.

[73] Assignee: General Electric Company, Waterford, N.Y.

[21] Appl. No.: 521,234

[22] Filed: Aug. 30, 1995

[51] Int. Cl.⁶ .................................................. B32B 9/04
[52] U.S. Cl. .................... 428/447; 522/13; 522/27; 522/28; 522/31; 522/32; 522/38; 522/39; 522/65; 522/66; 522/68; 528/15; 528/25; 556/479
[58] Field of Search ...................... 522/13, 27, 28, 522/31, 32, 38, 39, 65, 66, 68; 428/447; 528/15, 25; 556/479

[56] References Cited

U.S. PATENT DOCUMENTS

| | | |
|---|---|---|
| 4,279,717 | 7/1981 | Eckberg et al. . |
| 4,617,238 | 10/1986 | Crivello et al. . |
| 4,981,881 | 1/1991 | Crivello et al. . |
| 4,987,158 | 1/1991 | Eckberg . |
| 5,034,491 | 7/1991 | Wewers et al. . |
| 5,138,012 | 8/1992 | Riding et al. . |
| 5,178,959 | 1/1993 | Eckberg et al. . |
| 5,227,410 | 7/1993 | Eckberg et al. . |
| 5,240,971 | 8/1993 | Eckberg et al. . |
| 5,258,480 | 11/1993 | Eckberg et al. . |
| 5,272,233 | 12/1993 | Crivello et al. . |
| 5,360,833 | 11/1994 | Eckberg et al. . |
| 5,369,205 | 11/1994 | Eckberg et al. . |

FOREIGN PATENT DOCUMENTS

WO 9407965 4/1994 WIPO .

OTHER PUBLICATIONS

J. Macromol. Sci., Pure Appl. Chem., A33(4), 399–415, (1996) J.V. Crivello et al, "Synthesis and electron–beam polymerisation of 1–propenyl ether functional siloxanes".

Chem. Mater., 8(1), 209–218 (1996) J.V. Crivello & G. Lohden, "Synthesis and photopolymerization of 1–propenyl ether functional siloxanes".

J. Polym. Sci., Part A: Polym. Chem., 33(14), 2415–23, (1995) J.V. Crivello et al, "Chemoselective hydrosilations. I. Synthesis and photopolymerisation of 1–propenyl ether functionalised siloxanes".

*Primary Examiner*—Melvyn I. Marquis
*Attorney, Agent, or Firm*—Kenneth S. Wheelock

[57] ABSTRACT

Silicone release agents comprising propenyl-ether functionalized silicones exhibit a rapid cationic induce photo-cure. Such propenyl-ether functionalized silicones are synthesized by the hydrosilation of various α-allyloxy-ω-(1-propenoxy) alkanes with various linear and cyclic hydrogen functional siloxanes.

14 Claims, No Drawings

5,747,172

ULTRAVIOLET AND ELECTRON BEAM CURABLE PROPENYL-ETHER SILICONE RELEASE COMPOSITIONS

FIELD OF THE INVENTION

The present invention relates to ultraviolet and electron beam curable silicone release agents incorporating a propenyl-ether functionality.

BACKGROUND OF THE INVENTION

The preparation and use of epoxy-functionalized silicones for applications in ultraviolet and electron beam curable silicone release coatings is well-known in the art. These epoxy-functionalized silanes or silicones are generally prepared by the noble metal catalyzed hydrosilation of alkenyl epoxides using various silyl hydride functional silanes and siloxanes. Recently, this technology has been applied to the development of ultraviolet or electron beam curable silicone release coatings utilizing the following general synthetic procedure:

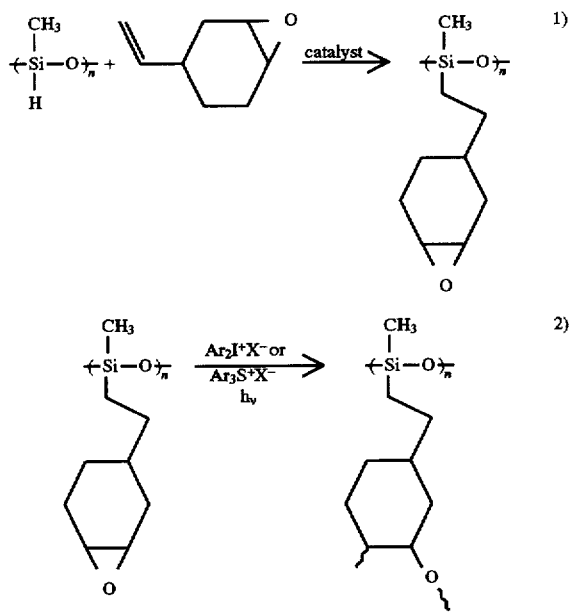

The epoxycyclohexyl-functional siloxanes prepared by the above reaction scheme generally exhibit excellent, high reactivity in ultraviolet curing and also possess very good release properties when applied to paper, plastic, metal, or wood substrates. Since heat is not required for their performance, the use of these material represents a very large savings in energy costs. Further, these materials are non-polluting since they generally do not contain volatile solvents. Also, since these materials do not require heat, they may be applied to paper at high rates without the need for re-moisturizing and without an accompanying heat induced change of dimensions.

Because these compositions are photo-curable, i.e. curable by ultraviolet radiation or electron beam radiation, these resins cure in ambient air eliminating the need for blanketing with an inert gas such as nitrogen. This is in direct contrast to ultraviolet curable acrylated silicones which require an inert atmosphere for curing because of the inhibiting effect of trace levels of oxygen. The susceptibility of alternative compositions to inhibition of the cure mechanism by trace levels of oxygen, renders these alternative compositions more expensive to use by virtue of the requirement that curing be conducted in an inert oxygen-free atmosphere.

It has been observed that vinyl ether monomers exhibit an even higher photo-sensitivity to curing than the acrylated or epoxy functional silicones. This observation has led to the preparation of vinyl ether functional silicones according to the following scheme:

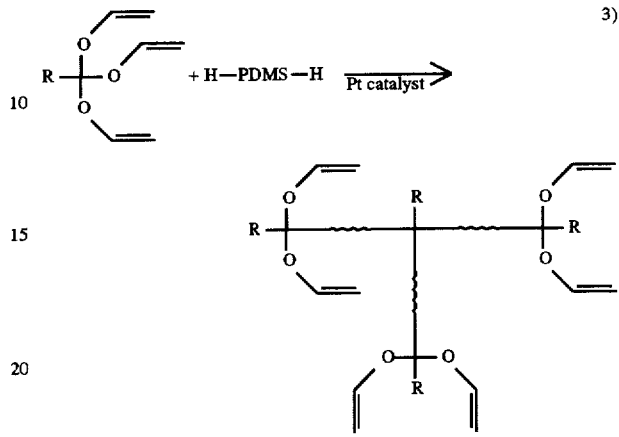

However, this reaction is not selective and frequently leads to polymerized products that are complex gels which are difficult to utilize. This problem arises because of the reactivity of the vinyl ether functionality and the interplay between that reactivity and the available hydrosilation reaction centers when attempts are made to synthesize a vinyl ether functional siloxane via hydrosilation.

SUMMARY OF THE INVENTION

There is provided by the present invention a silicone composition comprising an alkenyl siloxy group selected from $MP^=$, $DP^=$, or $TP^=$ where:

$MP^==((CH_3)CH=CH-O-(CH_2)_x-O-(CH_2)_y)_{3-a}R_a-SiO_{1/2}$;

$DP^==((CH_3)CH=CH-O-(CH_2)_x-O-(CH2)_y)_{2-b}R_b-SiO_{2/2}$;

$TP^==((CH_3)CH=CH-O-(CH_2)_x-(CH2)_y)-SiO_{3/2}$ where x is a non-zero integer, y is zero or a non-zero integer, a is zero, one, or two, b is zero or one, and each R of said alkenyl siloxy group is an independently selected monovalent saturated or unsaturated hydrocarbon radical having from one to thirty carbon atoms.

There is further provided by the present invention a silicone composition comprising a silicone selected from the group consisting of:

i) $MP^=DM$,
ii) $MP^=DMP^=$,
iii) $MP^=D_iDP^=_jMP^=$,
iv) $DP^=_j$,
v) $D_iDP^=_j$,
vi) $MP^=DP^=M$,
vii) $MP^=DP^=MP^=$,
viii) $MP^=DTM$,
ix) $MP^=D_iDP^=_j=M$,
x) $MP^=DTMP^=$,
xi) $MP^=D_iDP^=_jTMP^=$,
xii) $MP^=DT_kTP^=MP^=$,
xiii) $MP^=D_iDP^=_jT_kTP^=MP^=$,
xiv) $MP^=DQM$,
xv) $MP^=DQMP^=$, xvi) $MP'^=D_iDP'^=_jQMP'^=$,
xvii) $MP'^=DP'^=QM$,
xviii) $MP'^=DP'^=QMP'^=$,
xix) $MP'^=DQTM$,
xx) $MP'^=D_iQDP'^=_jM$,
xxi) $MP'^=DTQMP'^=$,
xxii) $MP'^=D_iDP'^=_jTQMP'^=$,
xxiii) $MP'^=DT_kTP'^=_lQMP'^=$, and
xxiv) $MP'^=D_iDP'^=_jT_kTP'^=_lQMP'^=$ where $M=R^1R^2R^3SiO_{1/2}$;
$D=R^1R^2SiO_{2/2}$; and
$T=R^1SiO_{3/2}$ where $R^1$, $R^2$, and $R^3$ may be independently selected from monovalent hydrocarbon radicals having from one to about thirty carbon atoms, Q is $SiO_{4/2}$, with i, j, k, and l being non-zero integers, with $MP'^=DP'^=$, and $TP'^=$ defined as follows:

$MP'^==((CH_3)CH=CH—O—(CH_2)_x—O—(CH_2)_y)_3$-$aR_a—SiO_{1/2}$;
$DP'^==((CH_3)CH=CH—O—(CH_2)_x—O—(CH2)_y)_2$-$bR_b—SiO_{2/2}$;
$Tp'^==((CH_3)CH=CH—O—(CH_2)_x—O—(CH2)_y)—SiO_{3/2}$ where x is a non-zero integer, y is zero or a non-zero integer, a is zero, one, or two, b is zero or one, and each $R_a$ or $R_b$ is an independently selected monovalent saturated or unsaturated hydrocarbon radical having from one to thirty carbon atoms.

Additionally there is provided both a curable and a cured alkenyl siloxy silicone composition. Such compositions are curable per se by virtue of the alkenyl functionality; they are also curable by the incorporation of suitable photo-catalysts.

The silicones of the present invention are useful for making a variety of coated articles, wherein the substrate may be paper, plastics, metal or wood.

DETAILED DESCRIPTION OF THE INVENTION

The present invention is based on the discovery that propenyl ether monomers have ultraviolet curing rates that are in excess of those observed for vinyl ether monomers but undergo hydrosilation at much slower rates. The differences in these two rates of reaction, the source of some of the difficulties in making vinyl ether functional silicones, has led to the ability to synthesize propenyl ether functionalized silicones that exhibit high ultraviolet curing rates. These materials can then be incorporated into release compositions with an accompanying improvement in cure rates.

These compounds possess both propenyl ether and allyl ether groups. By way of example, 1,4-butanediol may be mono-allyllated, followed by an isomerization reaction to convert the allyl group to a propenyl group followed by a second allyllation of the intermediate alcohol:

$$HO—(CH_2)_4—OH + CH_2=CH—CH_2Br \xrightarrow[R_4N^+Br^-]{NaOH}$$ 4)

$$CH_2=CH—CH_2—O—(CH_2)_4—OH + NaBr$$

$$CH_2=CH—CH_2—O(CH_2)_4—OH \xrightarrow[DMSO]{KO-t-Bu}$$ 5)

$$CH_3—CH=CH—O—(CH_2)_4—OH$$

$$CH_3—CH=CH—O—(CH_2)_4—OH +$$ 6)

$$CH_2=CH—CH_2Br \xrightarrow[R_4N^+Br^-]{NaOH}$$

$$CH_3—CH=CH—O—(CH_2)_4—O—CH_2—CH=CH_2$$

Applicant defines a dashed or a wavy line in a chemical structure, as previously drawn, to indicate a carbon carbon bond that may be either cis or trans around the adjacent unsaturation or as in some previously drawn structures to indicate polymerization. The resulting 1-allyloxy4-propenoxybutane undergoes hydrosilation only at the more reactive allyl moiety. This tends to eliminate secondary hydrosilation of condensed products so that gelation is avoided. The 1-allyloxy-4-propenoxybutane is representative of a series of compounds that contain both allyl and propenyl ether groups having the general formula:

$$CH_3—X——CH=CH—O—(CH_2)_n—O—CH_2CH=CH_2 \text{(cis or trans isomer)}$$

where X is usually $CH_2$ or absent, and n varies from one to about ten. As a representative precursor, a series of multi-functional silicon containing monomers have been prepared from the 1-allyloxy-4(1-propenoxy)butane utilizing catalytic hydrosilation and employing a variety of silyl or siloxyl hydride compounds. The structures of some of the compounds prepared by this synthetic procedure are listed:

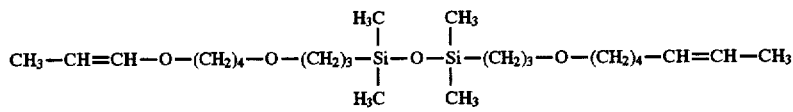

Structure I

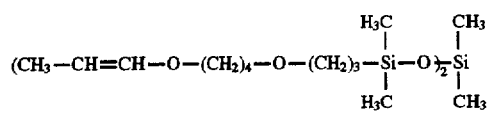

Structure II

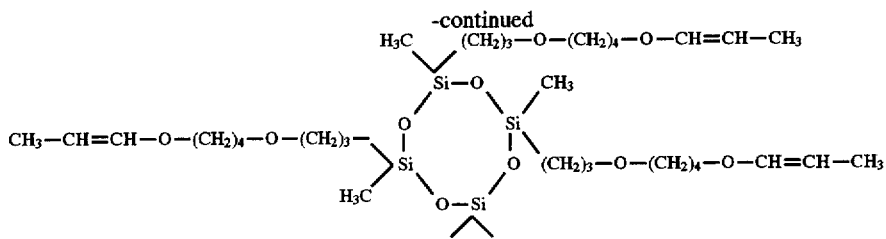

Structure III

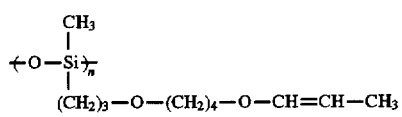

Structure IV

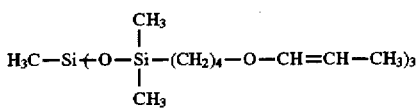

Structure V

For release applications, modified polymers, such as structure IV, or materials of similar structure, using copolymers containing both dimethylsiloxy and methyl hydrogen siloxy groups have been prepared.

The novel silicones of the present invention are silicones possessing an alkenyl siloxy group selected from $MP'^=$, $DP'^=$, or $TP'^=$ where:

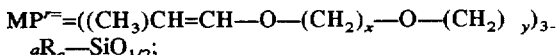

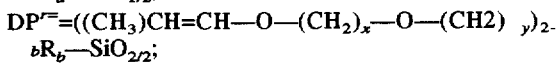

$TP'^==((CH_3)CH=CH-O-(CH_2)_x-O-(CH2)_y)-SiO_{3/2}$, where x is a non-zero integer, y is zero or a non-zero integer and a may be zero, one, or two whereby at least one $((CH3)CH=CH-O-(CH2)_x-O-(CH2)_y)$ group is present in the alkenyl siloxy group and the R group is a monovalent saturated or unsaturated hydrocarbon radical wherein when more than one R group is present, the R groups may be independently selected.

The variety of silicone compositions represented by the present invention thus include:

i) $MP'^=DM$
ii) $MP'^=DMP'^=$
iii) $MP'^=D_iDP'^=_jMP'^=$
iv) $DP'^=_j$
v) $D_iDP'^=_j$
vi) $MP'^=DP'^=M$
vii) $MP'^=DP'^=MP'^=$
viii) $MP'^=DTM$
ix) $MP'^=D_iDP'^=_j=^M$
x) $MP'^=DTMP'^=$
xi) $MP'^=D_iDP'^=_jTMP'^=$
xii) $MP'^=DT_kTP'^=_lMP'^=$
xiii) $MP'^=D_iDP'^=_jT_kTP'^=_lMP'^=$
xiv) $MP'^=DQM$
xv) $MP'^=DQMP'^=$
xvi) $MP'^=D_iDP'^=_jQMP'^=$
xvii) $MP'^=DP'^=QM$
xviii) $MP'^=DP'^=QMP'^=$
xix) $MP'^=DQTM$
xx) $MP'^=D_iQDP'^=_j=M$
xxi) $MP'^=DTQMP'^=$
xxii) $MP'^=D_iDP'^=_jTQMP'^=$
xxiii) $MP'^=DT_kTP'^=_lQMP'^=$
xxiv) $MP'^=D_iDP'^=_jT_kTP'^=_lQMP'^=$ where M, D, and T are any M, D, and T groups known in the art and Q is $SiO_{4/2}$, with i, j, k, and l being non-zero integers and the propenylether functionalized M, D, and T groups defined as follows:

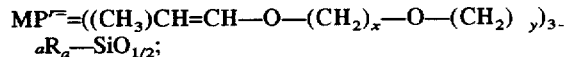

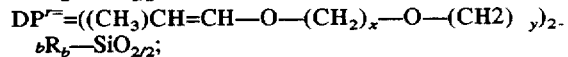

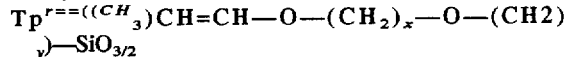

where x is a non-zero integer, y may be zero or a non-zero integer and a may be zero, one, or two whereby at least one $((CH_3)CH=CH-O-(CH_2)_x-O-(CH_2)_x)-O-(CH_2)_y)$ group is present in the structural unit. The R group of the propenyl modified structural group may be any monovalent saturated or unsaturated hydrocarbon radical known in the art and when there is more than one R group on the propenyl functionalized M structural unit, the R groups may be independently selected. Preferably R is a methyl group. Preferably x is from one to about ten and y is from about one to about three.

The art recognizes that M, D, and T groups may have various formulas, being variously substituted:

$R^1R^2R^3SiO_{1/2}=M$;

$R^1R^2SiO_{2/2}=D$; and $R^1SiO_{3/2}=T$ where $R^1$, $R^2$, and $R^3$ may be independently selected from monovalent saturated or unsaturated hydrocarbon radicals, generally having from one to about thirty carbon atoms for alkyl radicals, from two to thirty carbon atoms for alkenyl and alkynyl radicals, from six to thirty carbon atoms for aryl radicals, and from seven to thirty carbon atoms for alkylaryl radicals.

Such hydrocarbon radicals may be unsubstituted as in the case of unsubstituted alkyl, alkenyl, and alkynyl radicals, or they may be variously substituted with halogens such as fluorine, chlorine, bromine, and iodine whereby halo-alkyl, halo-alkenyl, and halo-alkynyl radicals result. Such halogen substitution may be singly, doubly, triply, or multiply substituted, e.g. chlorovinyl, 1,1,1-trifluoropropyl and the like. Further such hydrocarbon radicals may include aromatic centers such as phenyl, tolyl, xylyl, mesityl, anthracyl, naphthyl either by themselves or as a substituent on an aliphatic radical such as alkyl, alkenyl, or alkynyl radicals.

The silicon containing monomers and oligomers consist of a mixture of cis- and trans-propenyl isomers. These isomers are isolable as pure compounds. Generally, in preparing compositions suitable for use in release applications, isolation is not necessary and the mixtures resulting from synthesis may be used directly without separation of the isomers.

The propenyl ether siloxanes and silicones of the present invention are readily photo-polymerized by exposure to ultraviolet radiation in the presence of certain onium salts as cationic photoinitiators. Photoinitiators that may be used in the practice of the present invention are selected from the group consisting of diazonium salts, diaryliodonium salts, triarylsulfonium salts, diaryliodosonium salts, triarylsulfoxonium salts, dialkylphenacylsulfonium salts, and ferrocenium salts. Typically, these cationic photoinitiating salts are salts of perhalo-hypervalent acids such as tetrafluoroborate, hexafluorophosphate, hexafluoroarsenate, perchlorate, trifluoromethylsulfonate, and the like. The compounds of the present invention may also be cured by means of electron beams as long as a cationic photoinitiator is present. The amount of cationic photoinitiator required for ultraviolet or electron beam curing ranges from about 0.1 to about 10 weight percent based on the weight of the propenyl ether modified silane or siloxane present in the composition.

Since the silicones of the present invention contain an alkenyl moiety, they are curable by a variety of curing means: 1) a free radical cure, 2) ultraviolet and electron beam cure, e.g. photocure, and 3) chemical condensation cure. By chemical condensation cure Applicant defines the term to mean a catalyzed or uncatalyzed anionic or cationic addition polymerization of the olefinic substitution present in the alkenyl substituted silicone.

While one important utility for the compositions of the present invention is their use in release applications, the compounds of the present invention may be used in a variety of related applications including, but not limited to, coatings, sealants, adhesives, inks, and composites. It is anticipated that these materials would be compatible in a wide variety of formulations that also employ fillers, flow control agents, and other additives imparting improved properties of thixotropy, flatting and reinforcement.

EXPERIMENTAL

Preparation of 1-Allyloxy4(1-Propenoxy)butane

Into a 100 mL round bottom flask fitted with a magnetic stirrer, reflux condenser and nitrogen blanket inlet was placed 30 g (0.33 moles) 1,4-butanediol, 39.9 g allyl bromide (0.33 moles), 2.1 g tetra-n-butylammonium bromide (6.5 mmoles), 13.2 g sodium hydroxide (0.33 moles), and 90 mL toluene. The reaction mixture was stirred and heated to 65° C. and held at that temperature for a period of ten hours. After cooling, the reaction mixture was filtered to remove inorganic salts. The filtrate was poured into 200 mL distilled water and the organic layer was extracted several times with toluene. All the toluene solutions were combined and the toluene removed by evaporation on a rotary evaporator. The 4-allyloxy-1-butanol was recovered as an oil in a yield that was 55% of theoretical. The product was analyzed by proton nuclear magnetic resonance at 200 MHz in deuterochloroform and the following chemical shifts were observed: 1.63 (m, 4H, aliphatic C$\underline{H}_2$); 2.69 (1H, O$\underline{H}$); 3.42 (2H, C$\underline{H}_2$O—CH$_2$); 3.58 (2H, HO-C$\underline{H}_2$); 3.78 (d, 2H, C$\underline{H}_2$—CH=CH$_2$); 5.13 (m, 2H, CH—C$\underline{H}_2$); and 5.83 (m, C$\underline{H}$=CH$_2$).

There were combined 30 g 1-allyloxy-1-butanol (0.23 moles),51.7 g potassium tert-butoxide (0.46 moles) and 200 mL dimethylsulfoxide. This reaction mixture was stirred for one hour at 70° C. The progress of the reaction was monitored by proton nuclear magnetic resonance which showed the conversion of all of the allyl groups into 1-propenyl groups. The product consisted almost entirely of the cis isomer with less than 5% of the trans isomer present. The mixture was cooled to room temperature and slowly poured into 500 mL of distilled water. The resulting solution was extracted with methylene chloride and the extract was several times with distilled water. After solvent removal using a rotary evaporator, the residue was vacuum distilled at 1.0 mm Hg at 95° C. to result in the isolation of 4-(1-propenoxyl)-1-butanol in 83% yield. The product was analyzed by proton nuclear magnetic resonance at 200 MHz in deuterochloroform and the following chemical shifts were observed: 1.51 (d,3H, C$\underline{H}_3$); 1.71 (m,4H, aliphatic C$\underline{H}_2$); 2.62 (t, 1H, O$\underline{H}$); 3.58 (2H, HO—C$\underline{H}_2$); 3.68 (t, 2H, C$\underline{H}_2$—O—CH=), 4.32 (m, C$\underline{H}$—CH$_3$, cis isomer); 4.71 (m, C$\underline{H}$—CH$_3$, trans isomer); 5.89 (m, C$\underline{H}$—O, cis isomer); 6.13 (m, C$\underline{H}$—O, trans isomer).

A mixture of 20 g 4(1-propenoxy)-1-butanol (0.15 moles), 24.2 g allyl bromide (0.2 moles), 1.26 g tetra-n-butylammonium bromide (3.9 mmoles); 8 g sodium hydroxide (0.2 moles); and 60 mL toluene were stirred at 60° C. for ten hours. After cooling, the reaction mixture was filtered to remove inorganic salts and the filtrate was poured into distilled water. The organic layer was separated and the aqueous layer was washed again with fresh toluene. The toluene layers were combined and the solvent removed on a rotary evaporator leaving 1-allyloxy-4(1-propenoxy)butane (an α-allyloxy-ω-(1-propenoxy)alkane) as a clear oil. Further purification was accomplished by distillation at 110° C. under a vacuum of 0.7 mm Hg, obtaining a 75% yield.

Chemical analysis of the product based on C$_{10}$H$_{18}$O$_2$; theoretical: C, 70.55%; H, 10.66%; found: C, 70.28%; H, 10.63%. The product was analyzed by proton nuclear magnetic resonance at 200 MHz in deuterochloroform and the following chemical shifts were observed: 1.51 (d, 3H, CH$_3$); 1.68 (m, 4H, aliphatic C$\underline{H}_2$); 3.41 (m, 2H, CH$_2$—C$\underline{H}_2$); 3.72 (t, 2H, C$\underline{H}_2$—O—CH=); 3.91 (m, 2H, =CH—C$\underline{H}_2$); 4.34 (m, C$\underline{H}$—CH$_3$, cis isomer); 4.71 (m, CH—C$\underline{H}_3$, trans isomer); 5.13 (m, 2H, CH=C$\underline{H}_2$); 5.83 (m, C$\underline{H}$=CH$_2$); 5.89 m, C$\underline{H}$—O, cis isomer); 6.13 (m, C$\underline{H}$—O, trans isomer).

Hydrosilation of 1-Allyloxy-4(1-propenoxy)butane with 1,1,3,3-Tetramethylsiloxane Combined in a 10 mL round bottom flask were a mixture of 2 g 1-allyloxy-4-(1-propenoxy) butane (11.54 mmole) and 0.78 g 1,1,3,3-tetramethylphosphine (5.77 mmole). To this solution were added 6.0 mg tris(triphenylphosphine) rhodium (I) chloride (16.48×10$^{-3}$ mmole) and the resulting mixture heated at 60° C. for one hour. After this time, the proton nuclear magnetic resonance of the reaction mixture showed no evidence of a band at 4.6 and 5.3 ppm respectively assigned to the Si—H and allyl double bonds. The product, structure I, was obtained in quantitative yield as a colorless, low viscosity oil.

Hydrosilation of 1-Allyloxy-4(1-Propenoxy)Butane with 1,3,5,7-Octamethyltetrasiloxane In a manner similar to the previous hydrosilation procedure, 1 g of 1,3,5,7- octamethyltetrasiloxane (4.5×10$^{-3}$ mmole), 2.83 g of 1-allyloxy4(1-propenoxy) butane (16.63 mmole) and 7.16 mg of tris(triphenylphosphine) rhodium (I) chloride (6.48×10$^{-6}$ mmole) were combined together at 60° C. for one hour. There was obtained in quantitative yield the tetrafunctional silane, structure III.

Hydrosilation of 1-Allyloxy4(1-Propenoxy)Butane with Methyl-(Dimethylsiloxy) Silane The previously described hydrosilation reaction was repeated using 1 g methyltris(dimethyl)siloxane (3.72×10$^{-3}$ mole), 1.90 g 1-allyloxy-4(1-propenoxy) butane (1.12× 10$^{-2}$ mole), and 7.16 mg of tris(triphenylphosphine) rhodium (I) chloride (6.48×10$^{-6}$ mmole). The silicon containing trispropenyl ether, structure V, was obtained.

Ultraviolet Cure of Silicon Containing Propenyl Ethers

The photopolymerization of the monomers was carried out by spreading the bulk monomers containing 0.5 mole % (4-decyloxyphenyl) phenyliodonium hexafluoroantimonate as a thin film, approximately 1 mil thick, and then irradiating the film using a Fusion Systems, Inc. Laboratory UV Cure Processor fitted with a microwave activated 300 Watt UV lamp aligned perpendicular to the travel of a conveyer belt, conveying the test film, and mounted at a distance of 10 cm above the belt. Monomer I demonstrated a cure rate of 1.0–0.75 ft/sec requiring a dose of 275 mJ/cm$^2$. Monomers of structures II and V underwent a very rapid ultraviolet induced polymerization at the maximum speed attainable with the Laboratory Cure Processor, which was 3.2 ft/sec at dose of 78.5 mJ.cm$^2$.

Having described the invention that which is claimed is:

1. A silicone composition comprising an alkenyl siloxy group selected from MP$^{r=}$, DP$^{r=}$, or TP$^{r=}$ where:

MP$^{r=}$((CH$_3$)CH=CH—O—(CH$_2$)$_x$—O—(CH$_2$)$_y$)$_{3-}$
   $_a$R$_a$—SiO$_{1/2}$;

DP$^{r=}$((CH$_3$)CH=CH—O—(CH$_2$)$_x$—O—(CH2)$_y$)$_{2-}$
   $_b$R$_b$—SiO$_{2/2}$;

Tp$^{r=}$((CH$_3$)CH=CH—O—(CH$_2$)$_x$—O—(CH2)$_y$)—
   SiO$_{3/2}$

Where x is a non-zero integer, y is zero or a non-zero integer, a is zero, one, or two, b is zero or one, and each R of said alkenyl siloxy group is an independently selected monovalent saturated or unsaturated hydrocarbon radical having from one to thirty carbon atoms.

2. A silicone composition comprising a silicone selected from the group consisting of:

i) MP$^{r=}$DM,
   ii) MP$^{r=}$DMP$^{r=}$,
   iii) MP$^{r=}$D$_i$DP$^{r=}$$_j$MP$^{r=}$,
   iv) DP$^{r=}$$_j$,
   v) D$_i$DP$^{rx}$,
   vi) MP$^{r=}$DP$^{r=}$M,
   vii) MP$^{r=}$DP$^{r=}$MP$^{r=}$,
   viii) MP$^{r=}$DTM,
   ix) MP$^{r=}$D$_i$DP$^{r=}$$_j$=M,
   x) MP$^{r=}$DTMP$^{r=}$,
   xi) MP$^{r=}$D$_i$DP$^{r=}$$_j$TMP$^{r=}$,
   xii) MP$^{r=}$DT$_k$TP$^{r=}$$_l$MP$^{r=}$,
   xiii) MP$^{r=}$D$_i$DP$^{r=}$$_j$T$_k$TP$^{r=}$$_l$MP$^{r=}$,
   xiv) MP$^{r=}$DQM,
   xv) MP$^{r=}$DQMP$^{r=}$,
   xvi) MP$^{r=D}$$_i$DP$^{r=}$$_j$QMP$^{r=}$,
   xvii) MP$^{r=}$DP$^{r=}$QM,
   xviii) MP$^{r=}$DP$^{r=}$QMP$^{r=}$,
   xix) MP$^{r=}$DQTM,
   xx) MP$^{r=}$D$_i$QDP$^{r=}$$_j$=M,
   xxi) MP$^{r=}$DTQMP$^{r=}$,
   xxii) MP$^{r=D}$$_i$DP$^{r=}$$_j$TQMP$^{r=}$,
   xxiii) MP$^{r=}$DT$_k$TP$^{r=}$$_l$QMP$^{r=}$, and
   xxiv) MP$^{r=}$D$_i$DP$^{r=}$$_j$T$_k$TP$^{r=}$$_l$QMP$^{r=}$ where M=R$^1$R$^2$R$^3$SiO$_{1/2}$;

D=R$^1$R$^2$SiO$_{2/2}$; and

T=R$^1$SiO$_{3/2}$ where R$^1$, R$^2$, and R$^3$ may be independently selected from monovalent hydrocarbon radicals having from one to about thirty carbon atoms, Q is SiO$_{4/2}$, with i, j, k, and l being non-zero integers, with MP$^{r=}$DP$^{r=}$, and TP$^{r=}$ defined as follows:

MP$^{r=}$((CH$_3$)CH=CH—O—(CH$_2$)$_x$—O—(CH$_2$)$_y$)$_{3-}$
$_a$R$_a$—SiO$_{1/2}$;

DP$^{r=}$((CH$_3$)CH=CH—O—(CH$_2$)$_x$—O—(CH2)$_y$)$_{2-}$
$_b$R$_b$—SiO$_{2/2}$;

Tp$^{r=}$((CH$_3$)CH=CH—O—(CH$_2$)$_x$—O—(CH2)$_y$)—
SiO$_{3/2}$ where x is a non-zero integer, y is zero or a non-zero integer, a is zero, one, or two, b is zero or one, and each R$_a$ or R$_b$ is an independently selected monovalent saturated or unsaturated hydrocarbon radical having from one to thirty carbon atoms.

3. A curable composition comprising the silicone of claim 1.

4. A photocurable composition comprising the silicone of claim 1.

5. The composition of claim 1 further comprising a photocure catalyst selected from the group consisting of diazonium salts, diaryliodonium salts, triarylsulfonium salts, diaryliodosonium salts, triarylsulfoxonium salts, dialkylphenacylsulfonium salts, and ferrocenium salts.

6. The composition of claim 5 wherein the salts are selected from the group consisting of tetrafluoroborate salts, hexafluorophosphate salts, hexafluoroarsenate salts, hexafluoroantimonate salts, perchlorate salts, and trifluoromethylsulfonate salts.

7. The composition of claim 6 where the salts are diazonium salts, diaryliodonium salts, triarylsulfonium salts, diaryliodosonium salts, triarylsulfoxonium salts, dialkylphenacylsulfonium salts, and ferrocenium salts.

8. A cured composition comprising the composition of claim 1.

9. A cured composition comprising the composition of claim 2.

10. A cured composition comprising the composition of claim 5.

11. A cured composition comprising the composition of claim 6.

12. A cured composition comprising the composition of claim 7.

13. A coated substrate comprising the composition of claim 1 wherein said substrate is selected from the group consisting of paper, plastic, metal, and wood.

14. A coated substrate comprising the composition of claim 8 wherein said substrate is selected from the group consisting of paper, plastic, metal, and wood.

* * * * *